M. B. HAYWOOD.
DEVICE FOR PREPARING HORSES' HOOFS FOR SHOEING.
APPLICATION FILED JULY 31, 1909.
944,432.
Patented Dec. 28, 1909.
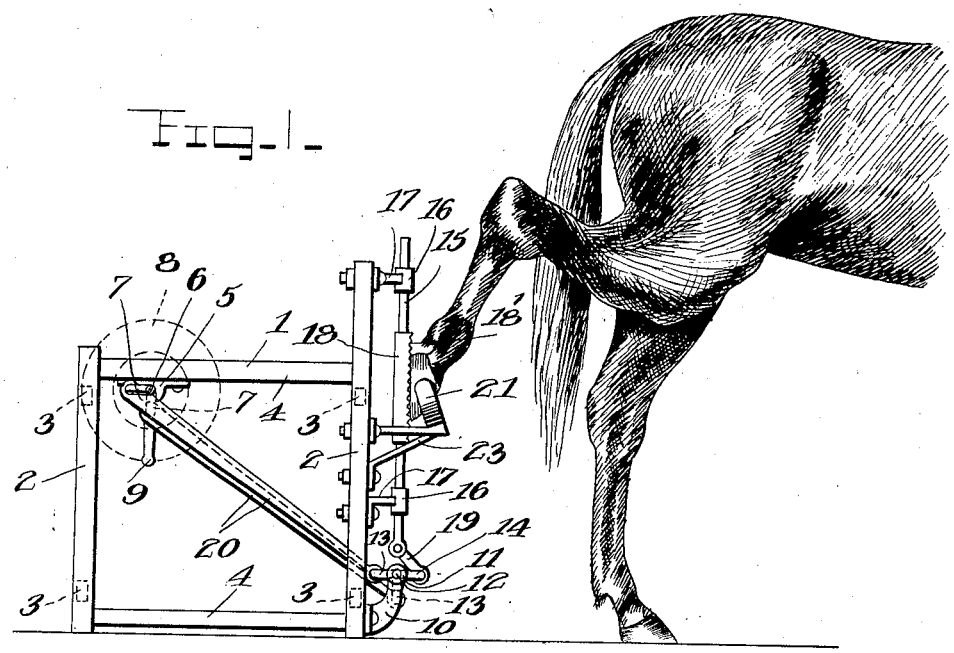
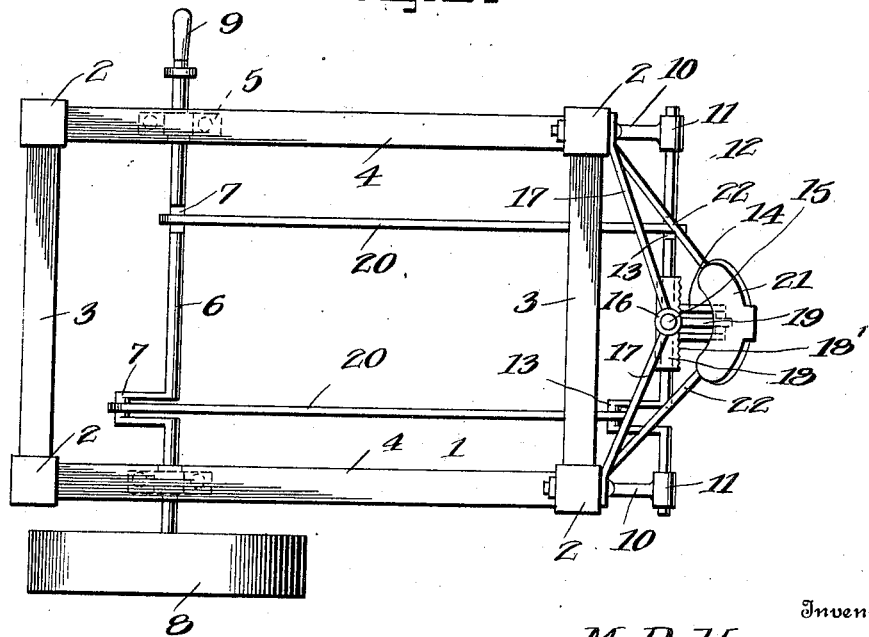
Witnesses
Inventor
M. B. Haywood
By John S. Duffie
Attorney

UNITED STATES PATENT OFFICE.

MATTHEW B. HAYWOOD, OF RICHMOND, ARKANSAS.

DEVICE FOR PREPARING HORSES' HOOFS FOR SHOEING.

944,432.  Specification of Letters Patent.  Patented Dec. 28, 1909.

Application filed July 31, 1909. Serial No. 510,544.

*To all whom it may concern:*

Be it known that I, MATTHEW B. HAYWOOD, a citizen of the United States, residing at Richmond, in the county of Little River and State of Arkansas, have invented certain new and useful Improvements in Devices for Preparing Horses' Hoofs for Shoeing, of which the following is a specification.
My invention has relation to a device for preparing horses' hoofs for shoeing.

The main object of my invention is to produce means whereby the necessity of holding the horse's hoof with the hands while preparing the same for shoeing may be avoided.

A further object of my invention is to provide means for filing said hoof when the same is held in the desired position.
With these and other objects in view my invention consists of the novel construction and arrangement of parts as are hereinafter fully described in this specification, illustrated in the accompanying drawings forming a part thereof and particularly pointed out in the appended claim.

Referring to the drawings: Figure 1 is a side elevation of my invention illustrating the use for which it is adapted. Fig. 2 is a top plan view of the same.

In the embodiment illustrated, the device comprises an upright supporting frame 1 consisting of the corner posts 2, the transverse beams 3 and the longitudinal beams 4.
Rotatably mounted by means of the bearings 5 is the transverse shaft 6 provided with the cranks 7. Keyed to one end of said shaft is a fly wheel 8, while secured to the opposite end is a crank handle 9.
Rotatably held to the forward posts 2 by means of the brackets 10 provided with the bearings 11, is a crank shaft 12, provided with the cranks 13 and 14. A vertical rod 15, which is slidably held in the bearings 16 formed integral with the brackets 17, is provided with a file or roughened portion 18. The lower end of said rod 15 is connected to said crank 14 by means of a coupling 19. Power is transmitted from said shaft 6 to said shaft 12 by means of the connecting rods 20.

A support, for the purpose of holding the hoof in place while it is being trimmed, consists of a concave plate 21 secured to the horizontal rods 22 and braced by the downwardly slanting rods 23. It will be seen that the concavity of said plate 21 may be varied to conform to various sizes of hoofs, which will depend upon the nature of the animals being shod.

Of course it is understood that the file 18 may be of any size desired and the teeth 18' thereon may be varied according to the nature of the work to be done and furthermore I may exercise the right to make such changes in the general construction, combination and arrangement of the several parts as do not depart from the spirit of the invention and which fall within the scope of the claim hereunto appended.

What I claim as new and desire to secure by Letters Patent, is:

In a device of the class described, an upright supporting frame, a crank shaft mounted for rotation thereon, means for the rotation thereof, a second crank shaft rotatably mounted to the forward part of said frame, means for the transmission of power from the first-mentioned shaft to said second-mentioned shaft, a reciprocating rod mounted to the forward part of said frame, coupling means between the said reciprocating rod and said second crank shaft, said rod being provided with a file, means for the support of an animal's hoof so that it will come into contact with said file, said means comprising a concave plate.

In testimony whereof I affix my signature, in presence of two witnesses.

MATTHEW B. HAYWOOD.

Witnesses:
W. I. JOYNER,
J. F. RHODES.